United States Patent
Gelardi et al.

[19]

[11] Patent Number: 6,142,403
[45] Date of Patent: Nov. 7, 2000

[54] ONE PLAY VIDEO CASSETTE

[75] Inventors: Paul J. Gelardi, P.O. Box 488, Kennebunkport, Me. 04043; David A. Capotosto, Biddeford, Me.; James R. Dussault, Kennebunkport, Me.

[73] Assignee: Paul J. Gelardi, Kennebunkport, Me.

[21] Appl. No.: 09/369,262

[22] Filed: Aug. 6, 1999

Related U.S. Application Data

[60] Provisional application No. 60/095,923, Aug. 7, 1998.

[51] Int. Cl.[7] .......................... G11B 23/087; G11B 23/04
[52] U.S. Cl. .................... 242/343.1; 242/346.1; 360/132
[58] Field of Search ................. 242/343.1, 343, 242/328, 346.1; 360/132

[56] References Cited

U.S. PATENT DOCUMENTS

| | | |
|---|---|---|
| 3,995,319 | 11/1976 | Harris . |
| 4,466,584 | 8/1984 | Chevalier et al. . |
| 4,575,023 | 3/1986 | Komiyama et al. ................ 242/343.1 |
| 4,660,115 | 4/1987 | Westfall et al. . |
| 4,660,116 | 4/1987 | Westfall et al. . |
| 4,802,048 | 1/1989 | Perkins et al. . |
| 4,842,217 | 6/1989 | Vinson . |
| 5,023,741 | 6/1991 | Conti et al. . |
| 5,473,688 | 12/1995 | Wiedemer . |

*Primary Examiner*—John Q. Nguyen
*Attorney, Agent, or Firm*—James Creighton Wray; Meera P. Narasimhan

[57] ABSTRACT

Tape partially curves around a one-way tape brake for a cassette. The brake has a cylindrical roller with a side extension. When the tape advances, a smooth cylindrical side of the roller allows tape forward movement. When the tape tends to reverse the tape pulls a friction surface rearward, turning the roller and frictionally engaging the tape and pinching it against a tape guide. Rearward tape motion is prevented.

20 Claims, 8 Drawing Sheets

ONE PLAY VIDEO CASSETTE

This application claims the benefit of U.S. Provisional Application No. 60/095,923, filed Aug. 7, 1998.

BACKGROUND OF THE INVENTION

For large market research, a one play video cassette is desirable. Certain types of research require that a message be seen only once in order to gauge its effectiveness.

SUMMARY OF THE INVENTION

A new, elegantly simple product uses a pivoting device or "roller" on the take-up side of the cassette. The "roller" is shaped and made of a material(s) that does not inhibit play but wedges and locks the tape against the take-up side guide post during rewind. The tape motion during normal play function allows the "roller" to rotate in one direction, exposing a low friction material. During attempted rewind the "roller" rotates in the opposite direction and locks itself and the tape against the take-up side guide post. The surface that runs against the tape during rewind and that wedges itself against the guide post is a high friction rubber or rubber-like material. A spring may be used to insure that the pivoting device engages the guide post during attempted rewind but swings out of the way during play. On the other hand, the simple driving torque of the tape may be adequate when the geometry of the tape paths, the "roller" and materials are optimized.

The preferred solution was found by concentrating on the tape path, which is relatively stable. The hub is a floating device with X, Y and Z motion.

The locking roller function much like the seat belt in a vehicle. In the play direction the roller turns to expose a smooth plastic surface with reasonably low friction. In the rewind direction the roller turns to expose a rubber or foam material. The increased friction causes the roller to rotate fully until it strikes the guide post, jamming the tape between the two features.

The locking roller is placed into the cassette in place of the existing guide roller.

The preferred "roller" is an eccentric. A small diameter portion has an outward facing low friction material. A larger diameter portion has a high friction material on its outward facing surface.

The present invention provides a robust construction for the single play videocassette. The new construction overcomes potential ill effects related to the adhesive used in conjunction with long play and the new request for "play-stop-play" ability. the new products eliminate the use of adhesives.

The new single play cassette is suitable for lengths from T5 to T135 (minutes). The cassette allows repeated play, pause and stopping. The cassette will not allow rewinding.

The new products are focused on the technology of overmolding. Manufacturing of the new roller is a two-step process. First the rollers must be molded. After these are molded, they must be reintroduced into another set of cavities where the overmolding will be done.

Overmolding is a process that allows one to mold a plastic part and then reintroduce that part into a mold and mold a second resin over the first. In this case the base resin for the roller is established as polypropylene. The choice of base resin may be changed. The material to be overmolded is something to replace the foam. The material chosen is a thermoplastic elastomer (TPE). TPE's are like rubber or silicone, only they are able to be molded like standard thermoplastic resin. The actual type and grade of TPE will be chosen after the tooling modifications are complete.

After the overmolding is complete, the parts are ready for insertion into the cassettes.

To accomplish this overmolding three things are done to the existing tooling. First, new cavities are made to create the rollers. Second, the existing cavities are modified to be utilized for overmolding. Third, a rotating runner is added to facilitate switching between the two sets of cavities.

Additionally, a fixture is made to hold the rollers to reintroduce them properly and efficiently into the mold.

These and further and other objects and features of the invention are apparent in the disclosure, which includes the above and ongoing written specification, with the drawings.

DETAILED DESCRIPTION OF THE PREFERRED EMBODIMENTS

Figure 1:
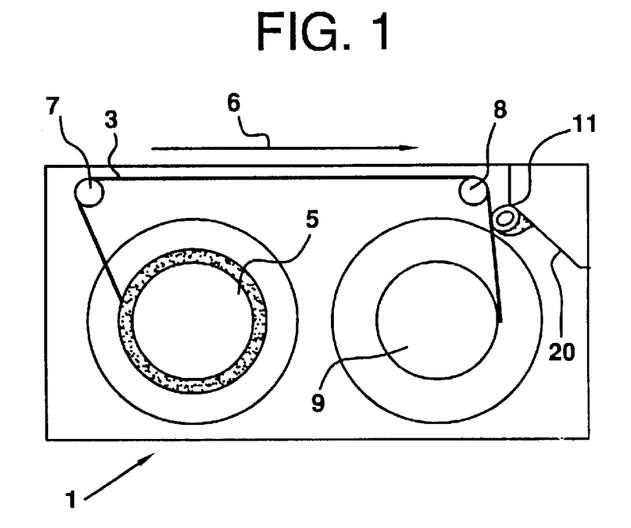
FIG. 1 is a schematic representation of a video cassette operating in the play, tape travel direction.
Figure 2:
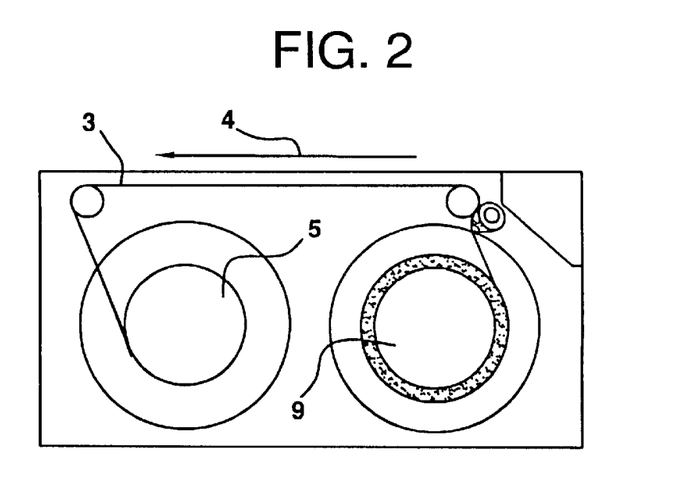
FIG. 2 is a schematic representation of a video cassette operating in an attempted rewind tape travel direction.
Figure 3:
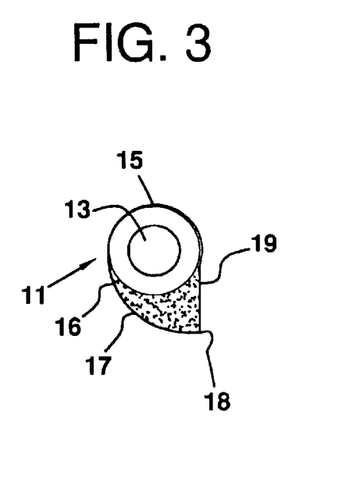
FIG. 3 is a detail of an eccentric rewind-preventing "roller".

Referring to FIGS. 1–3, a video cassette 1 or other tape cassette has a tape 3 loaded on a supply reel 5. During play the tape moves in the direction of arrow 6, passes around tape guides 7 and 8, and is taken up on take-up reel 9. In concluding marketing research a single play is desired. A pivoting device 11, also called a "roller", rocker or rewind brake, is mounted on a vertical fixed pin 13. The device has a low friction outer surface portion 15 and a high friction surface 16 on ramp portion 17, which has an extended tip 18 and a flat stop-abutting surface 19. A stop 20 is formed in the body of the cassette.

As shown in FIG. 1, when the tape 3 is advancing in the direction of arrow 6, the tape slides past the low friction surface 15 and urges the pivoting device 11 counterclockwise. Flat surface 19 abuts the stop 20, preventing further rotation of device 11, while the tape continues to be wound past the take-up guide pin 8 and onto the take-up reel 9.

When an attempt is made to rewind the tape 3, as shown in FIG. 2, rewinding is prevented, ensuring a single play.

The supply reel 5 is driven in reverse, tending to rewind the tape 3 on reel 5 by moving the tape in the direction of arrow 4. The tape contacts the pivoting device and tends to rotate it in a clockwise directing, bringing the friction surface 16 into contact with the tape and pulling the pivoting device further in the counterclockwise direction. The extension 17 and point 18 move the tape inward, further increasing the normal force and the friction force and pinching the tape against the take-up guide post 8. The tape is prevented from moving in the rewind direction because of its partial wrapping around the friction surface 16 of the pivoting member 11, and because of the pinching of the tape 3 between the take-up guide post 8 and the friction surface 16.

As shown in FIG. 1, the tape torque pivots brake 11 out of the way, exposing low friction material 15.

As shown in FIG. 2, the tape torque pivots the brake 11 into the guide post, exposing low friction material to brake tape movement, and the curved ramp wedges the former gap shut.

Figures 4, 5:
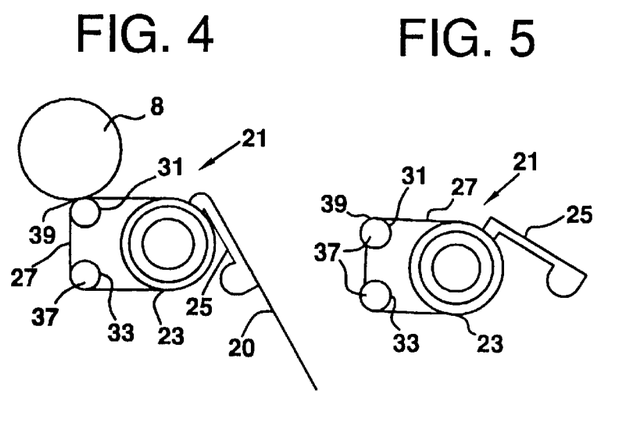
FIG. 4 is a top plan detail of an alternate locking "roller" with a spring showing the spring compressed against a stop and having an O-ring friction surface
FIG. 5 is a top plan detail of an alternate locking "roller" with a spring showing the spring extended.

As shown in FIGS. 4 and 5, a special pivoting brake 21 has a body 23 with an integral spring 25 extending in one direction. A brake projection 27 extends in the opposite direction. The brake projection has parallel recesses 31 and 33 which receive, trap and hold an O-ring 37. Edge portions 39 of the O-ring extend beyond the recesses and form the high friction brake surfaces.

Figure 6:
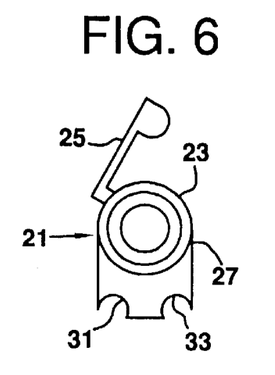
FIG. 6 is a top plan of the alternate locking "roller" without the O-ring.

As shown in FIG. 4, spring 25 is compressed against stop 20 when the tape moves clockwise around take-up guide post 8 toward the take-up reel. The molded cantilevered form of the spring 25 is shown in FIGS. 5, 6 and 9.

Figure 7:
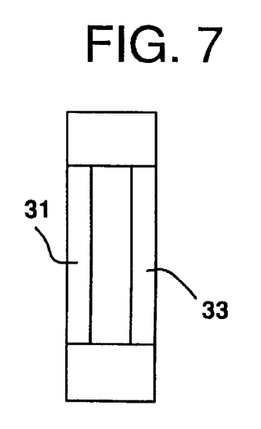
FIG. 7 is a front elevation of the "roller" shown in FIG. 6.
Figure 8:
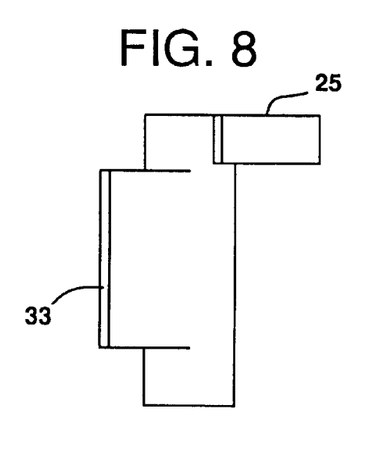
FIG. 8 is a side elevation of the "roller" shown in FIG. 6.
Figure 9:
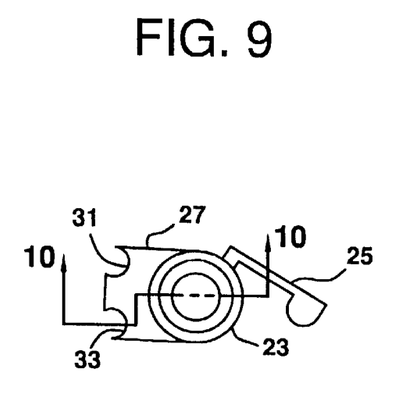
FIG. 9 is a top plan of the spring "roller" showing a section line 10—10.

FIGS. 7–9 show recesses 31 and 33 in which O-ring 37 is mounted.

Figure 10:
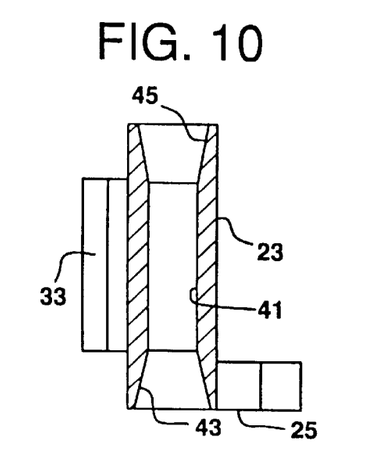
FIG. 10 is a cross-section taken along line 10—10 of FIG. 9.

FIG. 10 shows a cross-section taken along line 10—10 in FIG. 9 in which cylindrical recess 41 has lead-in slopes 43 and 45, which facilitate placing the roller on a take-up guide post.

Figure 11:
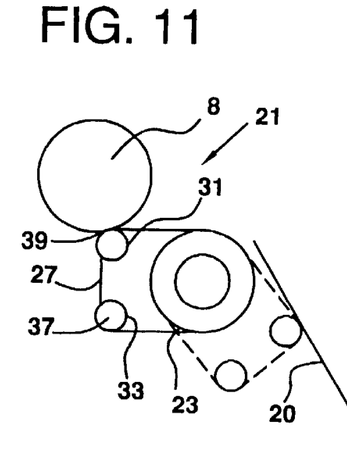
FIG. 11 is a second alternate embodiment of a "roller" rewind preventer shown against a stop in the tape playing position and against the take-up guide post in a tape rewind-preventing position.
Figure 12:
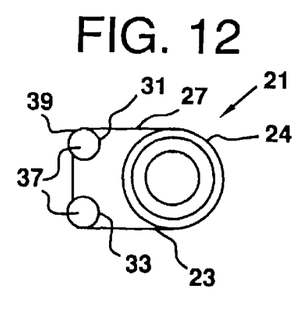
FIG. 12 is a top plan detail of an alternate locking "roller" with a spring showing the spring extended.
Figure 13:
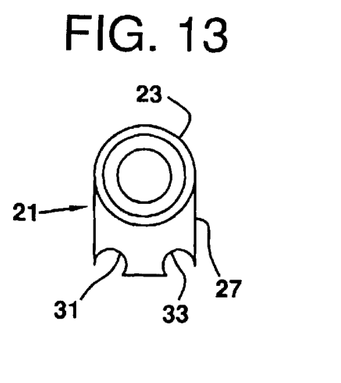
FIG. 13 is a top plan of the alternate locking "roller" without the O-ring.
Figure 14:
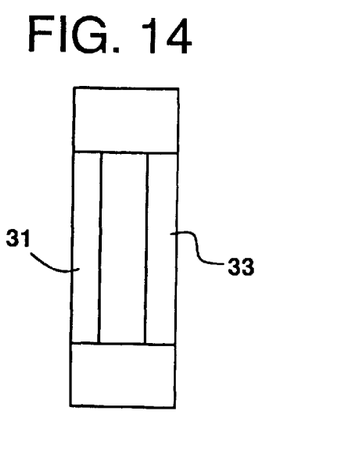
FIG. 14 is a front elevation of the "roller" shown in FIG. 13.
Figure 15:
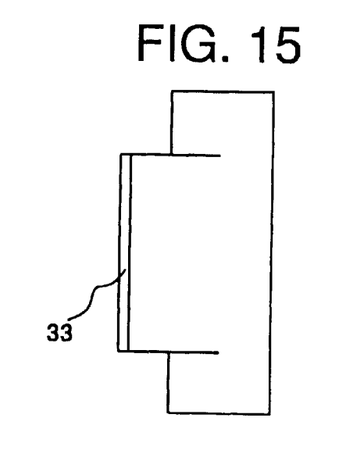
FIG. 15 is a side elevation of the "roller" shown in FIG. 13.
Figure 16:
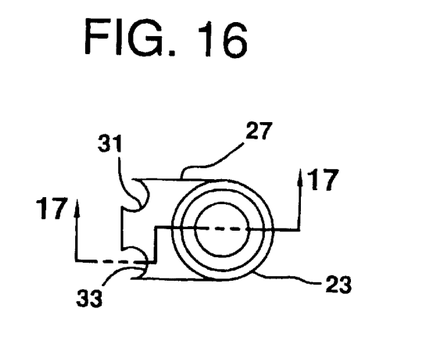
FIG. 16 is a top plan of the spring "roller" showing a section line 17—17.
Figure 17:
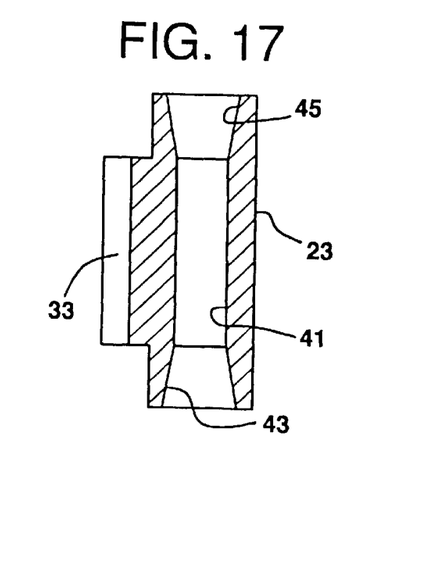
FIG. 17 is a cross-section taken along line 17—17 of FIG. 16.
Figure 18:
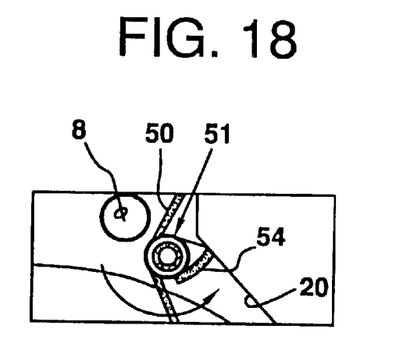
FIG. 18 shows a preferred form of the locking roller rotated in the tape playing direction.
Figure 19:
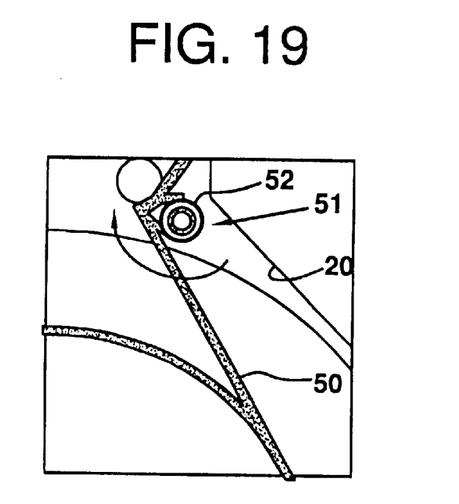
FIG. 19 shows the preferred form of the lock rotated in the locking direction.

As shown in FIGS. 11–17, the second alternate device may be made without a spring, with the friction of the tape sliding along the smooth surface 24 of the body 23, turning the lock toward the stop 20 while the tape moves in the play position, as shown in FIG. 11. When an attempt is made to reverse the tape, the tape friction carries the locking roller 21 in the clockwise direction, pinching the tape between the edge 39 of the O-ring 37 and the take-up guide post 8.

In a preferred embodiment shown in FIGS. 18–27, the tape 50 slides along the relatively smooth surface 52 of locking roller 51, and rotates the locking roller counterclockwise to the stop 20. When the tape 50 is pulled from the reel in the reverse direction, the tape turns the locking roller and finally engages the high friction surface 54 for tightly pulling the locking roller 51 in the clockwise direction and pitching the tape 50 between the guide post 8 and the high friction surface 54 of the locking roller 51.

Figure 20:
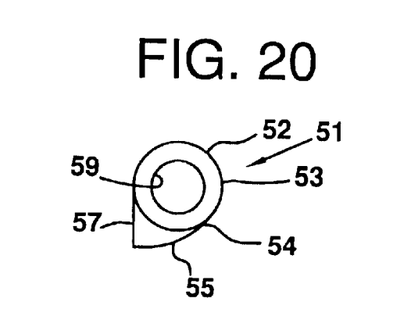
FIG. 20 is a bottom view of the roller.

FIG. 20 shows a bottom view of the preferred locking roller 51, which is constructed as a cylinder 53 with a projection 55. The cylinder 53 has a relatively smooth, low friction surface 52 and a high friction surface 54 on the projection 55. The flat surface 57 is a surface which abuts stop 20. The cylindrical inner surface 59 rotatively fits over a guide roller post, which is usually occupied by a guide roller.

Figure 21:
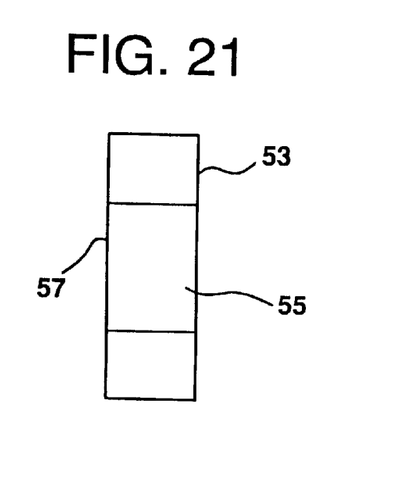
FIG. 21 is a side elevation of the roller as shown in FIG. 20.

FIG. 21 is a side elevation showing the cylindrical surface 53, the flat surface 57 and the curved surface 55.

Figure 22:
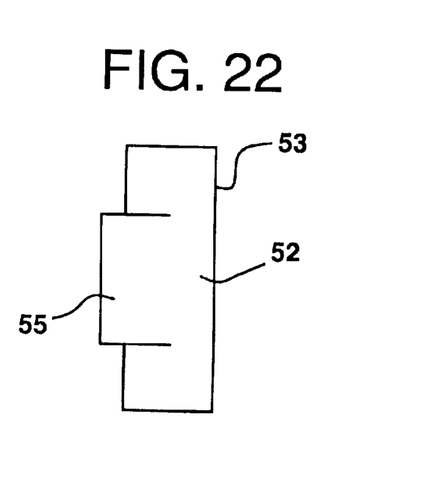
FIG. 22 is a side elevation of the locking roller rotated 90°.

FIG. 22 is a side elevation similar to FIG. 21 but turned 90° to show the curved surface 55 and the smooth cylindrical surface 52 in the center tape-contacting section.

Figure 23:
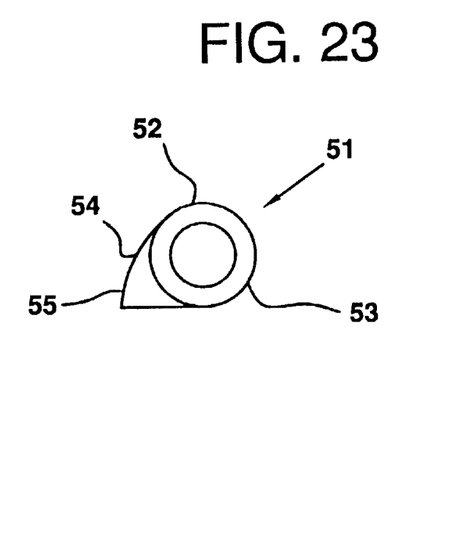
FIG. 23 shows the plan view of the locking roller in the same aspect as FIG. 22.

FIG. 23 is a top plan view of the roller 51 showing the smooth surface 52 on the cylindrical portion 53 and the high friction surface 54 on the curved portion 55.

Figure 24:
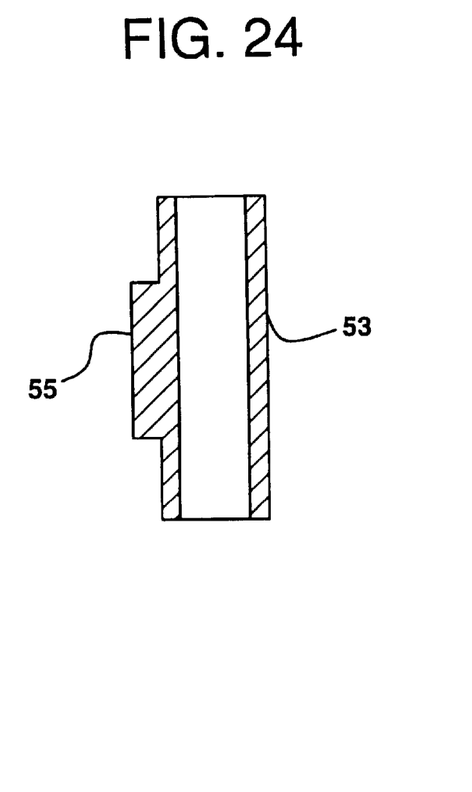
FIG. 24 is a cross-sectional view of the locking roller.

FIG. 24 is a section view showing the cylindrical body 53 with the projection 55.

Figure 25:
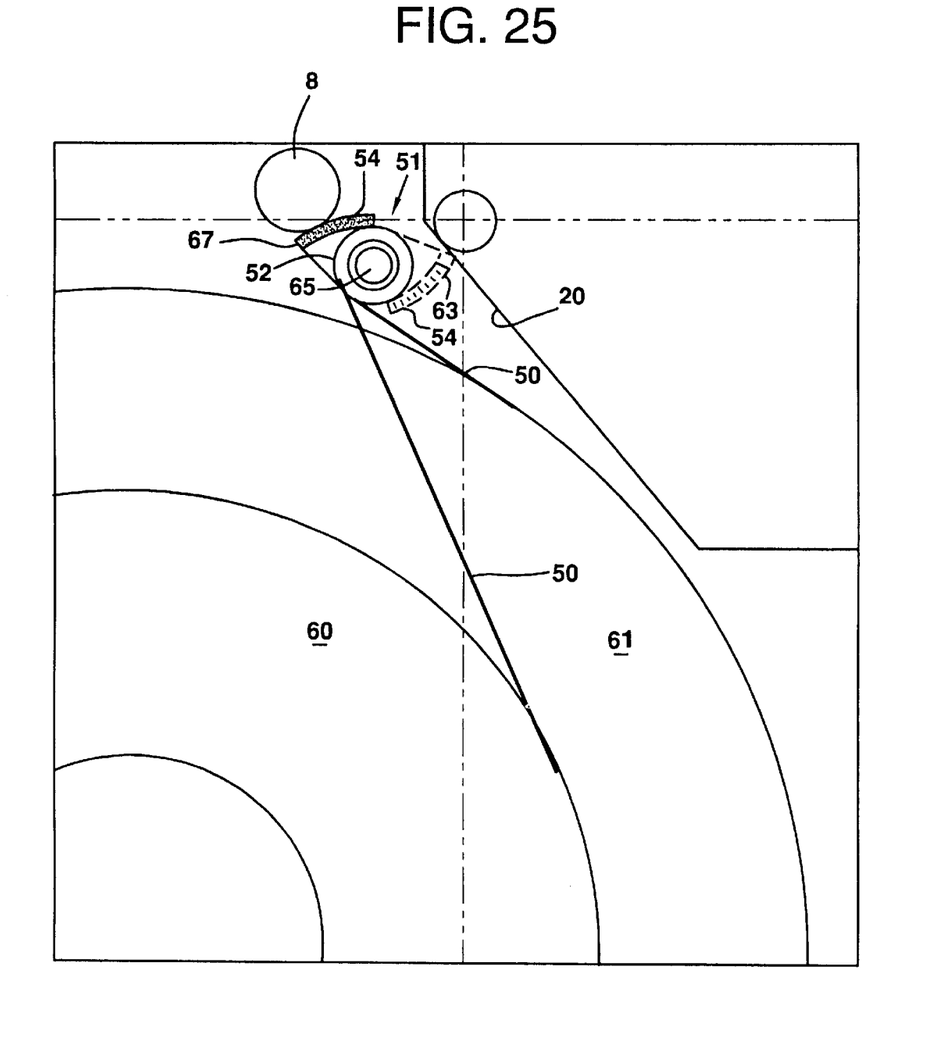
FIG. 25 shows two views of the locking roller with a phantom view in the tape playing direction and a solid view in the tape locking direction.

FIG. 25 shows the tape 50 being wound on a partially full take-up reel 60 and a substantially full take-up reel 61. All the tape is being wound and the reels 60 and 61 are moving in the clockwise direction. The tape slides along the low friction surface 52 of the locking roller 51. Pulling the locking roller into the position 63 against the stop 20 when an attempt is made to reverse the tape 50, the tape draws the locking roller 51 in the clockwise direction around mounting pin 65, and engages the friction material 54 and pinches the tape between the friction material and the take-up guide post 8.

The counterclockwise unlocked position 63 of the locking roller 51 is shown in phantom view and the locked position 67, as shown in the full lines.

Figure 26:
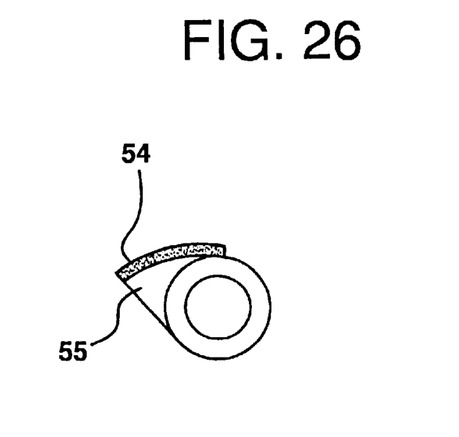
FIG. 26 shows one form of the locking surface.
Figure 27:
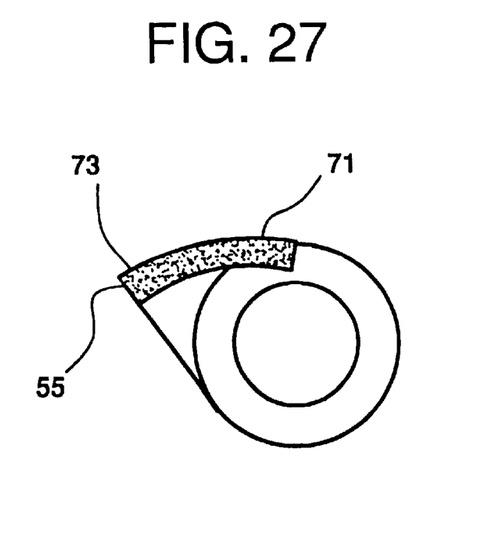
FIG. 27 shows a preferred form of the locking surface on the locking roller.
Figures 28, 29, 30, 31, 32, 33, 34:
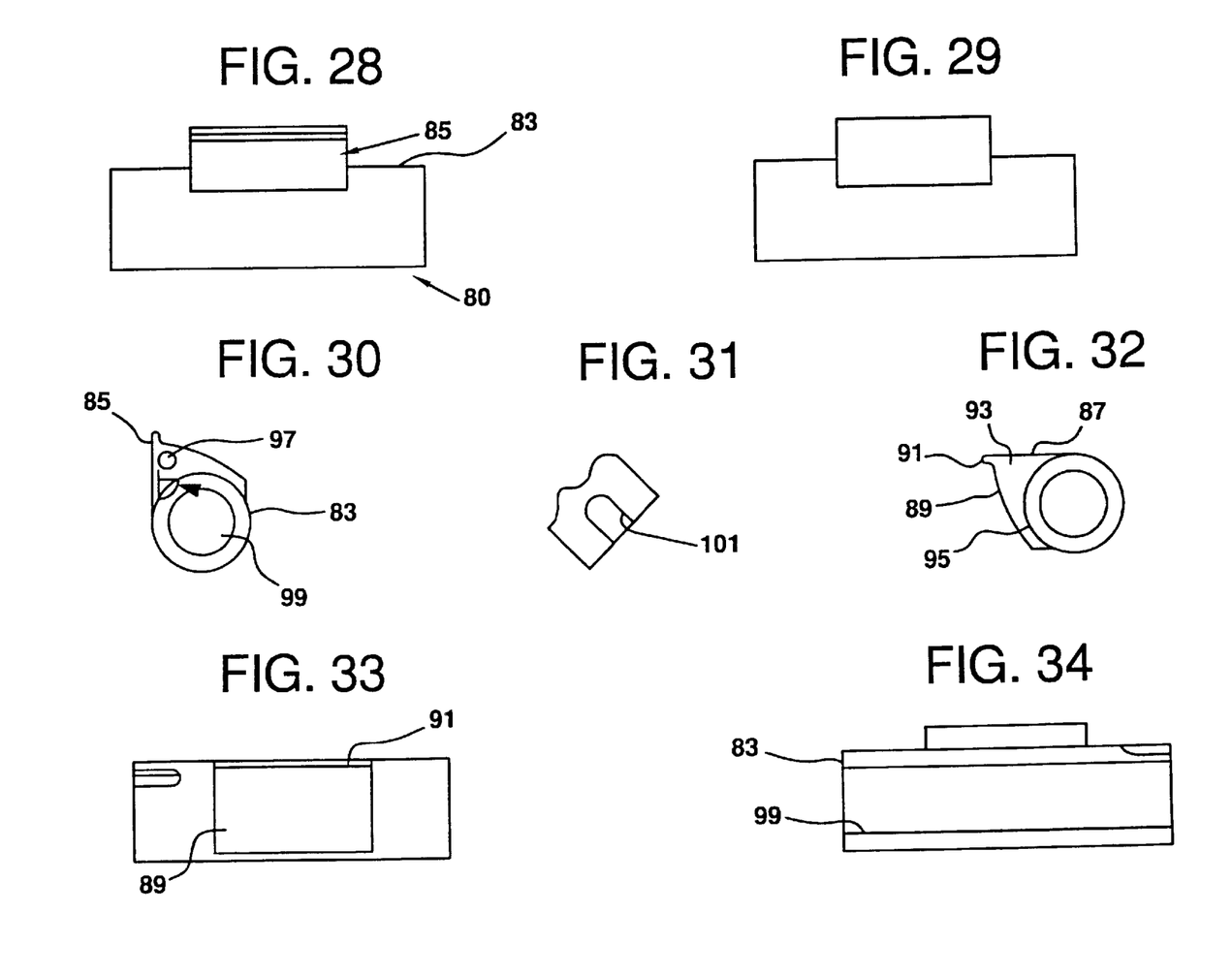
FIG. 28 is a front view of a modified locking roller base.
FIG. 29 is a rear view of the locking roller base shown in FIG. 28.
FIG. 30 is a side view of the locking roller base shown in FIGS. 28 and 29.
FIG. 31 is a detail of the end groove shown in FIG. 30.
FIG. 32 is an opposite side view of the roller base rotated 90°.
FIG. 33 is a front elevation of the locking roller base taken at the same angle as FIG. 32.
FIG. 34 is a section through the locking roller at the notch.

In one embodiment, as shown in FIG. 26, the friction material 54 is a high friction foam or rubber 73 overmolded or adhered with PSA on the curved surface of the projection 55. In another embodiment, a recess 71 is formed in the cylindrical surface where the curved surface of the projection 55 meets the cylindrical surface, and the foam or rubber material 73 is overmolded or adhered with PSA on the curved surface of the projection 55 and in the recess 71.

A preferred roller 81 shown in FIGS. 28–37 replaces the locking roller 11. The locking roller 81 shown in FIG. 37, for example, has a locking roller base 80 shown in FIGS. 28–34. The locking roller base has a roller body 83 and an enlarged extension 85, which has a generally tangential flat wall 87, a rounded sloping generally oppositely tangential wall 89, and an outward extending lip 91. The sides 93 of the extension have a generally triangular shape in which the base is a continuation of the roller body 83. A cylindrical hole 97 extends into at least one side 93 and may extend into both sides or through the entire extension 85. A cylindrical opening 99 extends through the roller body 83. A notch 101 formed in the outer surface at one end of the roller body is provided for visual aid in assembly orientation.

The locking roller body 83 is preferably made of polypropylene.

Figure 35:
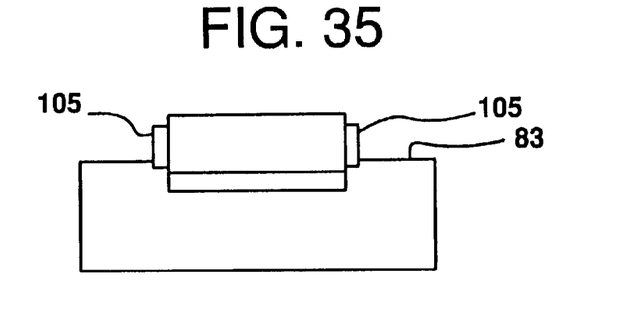
FIG. 35 is a front elevation of a locking roller showing the second slot applied TPE friction surface.
Figure 36:
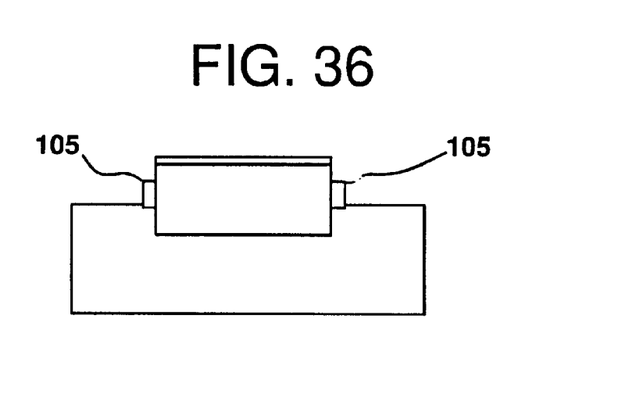
FIG. 36 is a rear elevation of the locking roller shown in FIG. 35.
Figure 37:
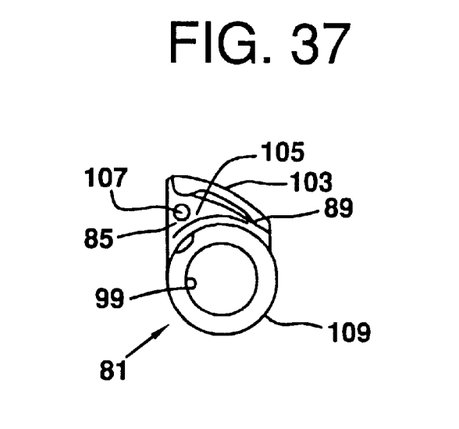
FIG. 37 is an end view of the complete locking roller shown in FIGS. 34 and 35.

After molding the locking roller body, an additional shot of rubber-like material is added in a second shot molding process. The second shot material is a thermoplastic elastomer (TPE), which is a rubber or silicone-like material. The rubber-like braking surface 103 extends over the curved surface 89 of the base. Teardrop-shaped side arms 105 are integrally formed with the top surface 103. Inward extensions 107 on arms 105 extend into the holes 97 in opposite sides of the body extension 85. The side arms 105 and the inward extensions 107, which are integrally formed with the top layer 103, secure the TPE layer to the roller body extension 85, forming the locking roller 81. In the forward direction, the tape rides on the lubricating polypropylene surface 109 of the locking roller body 83. In an attempt to reverse the tape, the roller 109 and its internal wall 99 turn on a fixed spindle, presenting the outer braking surface 103 of the TPE rubber-like layer. Further rearward movement of the tape drags the high friction material and the roller into wedging and breaking relationship by pinching the tape between the rubber-like surface and the guide roller.

In embodiments of the invention the brake pinches the tape against the guide or rests the braking TPE surface against the tape when at rest. Forward movement of the tape turns the brake, exposing the lubricating polypropylene surface of the roller body to the tape instead of the TPE surface.

While the invention has been described with reference to specific embodiments, modifications and variations of the invention may be constructed without departing from the scope of the invention.

We claim:

1. A single play tape cassette apparatus comprising a tape, a source of tape within the cassette, and spaced guides guiding the tape and around which the tape moves for presenting the tape to an information pickup head, and having a takeup roll connected to the tape for winding the tape and advancing the tape in a forward movement from the tape source and around the tape guides, a pivoting one-way tape friction brake positioned on a side of the tape opposite from one of the guides, the pivoting brake having a smooth lubricating surface and structured for presenting said smooth surface for contact with the tape during forward tape movement, and having a high friction surface on an extension structured for engaging and braking the tape against said one guide upon attempted rearward tape motion to prevent the tape from moving in the rewind direction.

2. The apparatus of claim 1, wherein the pivoting brake comprises a roller having a cylindrical body made of low friction material and having said extension on that body, and having a high friction material on that extension.

3. The apparatus of claim 1, wherein the extension comprises a wedge.

4. The apparatus of claim 3, wherein the extension comprises a high friction rubber-like wedge.

5. The apparatus of claim 3, wherein the wedge comprises an extension of the brake, and wherein the high friction material is deposited on the wedge by second shot molding.

6. The apparatus of claim 5, wherein the high friction material includes integrally formed lateral arms extending around the side of said wedge.

7. The apparatus of claim 6, wherein the wedge further has inward extending holes in sides of the wedge, and wherein the high friction material has lateral arms with inward extensions extending into the holes in the sides of the wedge.

8. The apparatus of claim 1, wherein the extension comprises a rectangular extension with partially cylindrical recesses at remote corners of the extension, and further comprising an O-ring deposed in the cylindrical recesses.

9. The apparatus of claim 1, wherein the friction surface material is mechanically interlocked with a base material of the pivoting brake.

10. The apparatus of claim 9, wherein the friction surface material is formed by a second shot molding and extends around and into the extension on the base material.

11. A tape friction pivoting brake apparatus for a single play tape cassette having a tape, a source of tape within the cassette, and spaced guides guiding the tape and around which the tape moves for presenting the tape to an information pickup head, and having a takeup roll connected to the tape for winding the tape and advancing the tape in a forward movement from the tape source and around the tape guides, a tape friction pivoting brake positioned on an opposite side of the tape from one of the guides, the pivoting brake having a smooth lubricating surface and structured for presenting said smooth surface for contact with the tape during forward movement, and having a high friction surface on an extension structured for engaging and braking the tape against said one guide upon attempted rearward motion to prevent the tape from moving in the rewind direction.

12. The apparatus of claim 11, wherein the pivoting brake comprises a roller having a cylindrical body made of low friction material and wherein the extension has opposite generally tangential walls forming the extension on that body, and having a high friction material on at least one wall of the extension.

13. The apparatus of claim 12, wherein the extension comprises a rectangular extension with partially cylindrical recesses at corners of the extension, and the high friction material further comprising an O-ring deposited in the cylindrical recesses.

14. The apparatus of claim 11, wherein the extension comprises a wedge.

15. The apparatus of claim 14, wherein the wedge-like extension comprises an extension of the brake, and wherein the high friction surface material is deposited on at least one surface of the wedge by second shot molding.

16. The apparatus of claim 15, wherein the high friction surface material includes integrally formed lateral arms extending around sides of the wedge.

17. The apparatus of claim 16, wherein the wedge further has inward extending holes in sides of the wedge, and wherein the surface material lateral arms further comprising extensions extending into the holes in the sides of the wedge.

18. The apparatus of claim 14, wherein the extension comprises a high friction rubber-like wedge.

19. The apparatus of claim 11, wherein the friction surface material is mechanically interlocked with a base material of the pivoting brake.

20. The apparatus of claim 19, wherein the friction surface material is formed by a second shot molding and extends around and into the extension on the brake.

\* \* \* \* \*